United States Patent
Ankney

(10) Patent No.: US 9,682,605 B2
(45) Date of Patent: Jun. 20, 2017

(54) VARIABLE DAMPENING SPEED PISTON HEAD ASSEMBLY FOR RADIO CONTROLLED CARS SHOCK ABSORBER AND METHOD

(71) Applicant: Michael A Ankney, Cypress, TX (US)

(72) Inventor: Michael A Ankney, Cypress, TX (US)

( * ) Notice: Subject to any disclaimer, the term of this patent is extended or adjusted under 35 U.S.C. 154(b) by 0 days.

(21) Appl. No.: 15/092,876

(22) Filed: Apr. 7, 2016

(65) Prior Publication Data

US 2016/0243917 A1    Aug. 25, 2016

Related U.S. Application Data

(63) Continuation-in-part of application No. 14/631,190, filed on Feb. 25, 2015.

(60) Provisional application No. 62/295,284, filed on Feb. 15, 2016.

(51) Int. Cl.
| | |
|---|---|
| *B60G 17/08* | (2006.01) |
| *B60G 13/08* | (2006.01) |
| *F16F 9/348* | (2006.01) |
| *F16F 9/512* | (2006.01) |
| *F16F 9/516* | (2006.01) |

(52) U.S. Cl.
CPC ............. *B60G 17/08* (2013.01); *B60G 13/08* (2013.01); *F16F 9/348* (2013.01); *F16F 9/512* (2013.01); *F16F 9/516* (2013.01); *B60G 2202/24* (2013.01); *B60G 2206/41* (2013.01); *B60G 2300/20* (2013.01); *B60G 2500/112* (2013.01); *B60G 2600/21* (2013.01)

(58) Field of Classification Search
CPC .... B60G 17/08; B60G 13/08; B60G 2202/24; B60G 2206/41; B60G 2300/20; B60G 2500/112; B60G 2600/21
USPC ............................ 188/322.15, 282.6, 322.13
See application file for complete search history.

(56) References Cited

U.S. PATENT DOCUMENTS

| | | | | |
|---|---|---|---|---|
| 446,426 | A * | 2/1891 | Bryon, Jr. ............. | F16F 9/3405 16/66 |
| 3,043,404 | A * | 7/1962 | Peras ...................... | F16F 9/061 137/493 |
| 3,791,407 | A * | 2/1974 | Nicholls ............... | F16F 9/3405 137/493.8 |
| 3,837,445 | A * | 9/1974 | Pierle .................... | F16F 9/3484 137/513.7 |
| 3,844,389 | A * | 10/1974 | de Carbon ............ | F16F 9/3484 137/493.8 |
| 3,984,889 | A * | 10/1976 | Blomgren .......... | B65G 69/2817 14/71.7 |
| 4,060,155 | A * | 11/1977 | Duckett ................ | B60G 13/08 137/493.1 |
| 4,620,619 | A | 11/1986 | Emura et al. | |
| 4,775,038 | A | 10/1988 | Unnikrishnan et al. | |

(Continued)

*Primary Examiner* — Thomas J Williams
*Assistant Examiner* — Mariano Sy
(74) *Attorney, Agent, or Firm* — Kenneth L. Nash

(57) ABSTRACT

An apparatus and method for a piston head assembly for an R/C car shock absorber provides for variable dampening forces during compression movement based on how fast the piston is moving. During a first compression stroke, more fluid is allowed through the at least one variable valves, while during a second compression stroke faster than the first stroke, fluid movement is restricted through the at least one variable valves to quickly return the vehicle to proper riding position with respect to the road or track.

11 Claims, 2 Drawing Sheets

(56) References Cited

U.S. PATENT DOCUMENTS

| | | | |
|---|---|---|---|
| 4,809,828 A | 3/1989 | Nakazato | |
| 5,709,290 A * | 1/1998 | Ekert | F16F 9/3482 188/322.15 |
| 6,247,563 B1 * | 6/2001 | De Carbon | F16F 1/32 188/282.5 |
| 6,260,832 B1 * | 7/2001 | Vignocchi | B60G 15/061 188/282.5 |
| 6,540,052 B2 | 4/2003 | Fenn et al. | |
| 6,802,408 B2 * | 10/2004 | Krammer | F16F 9/348 188/282.1 |
| 7,040,068 B2 | 5/2006 | Shinata | |
| 7,213,689 B2 | 5/2007 | Chang | |
| 7,310,876 B2 | 12/2007 | May et al. | |
| 8,083,039 B2 | 12/2011 | Vanbrabant | |
| 8,235,188 B2 | 8/2012 | Kais | |
| 8,517,153 B2 * | 8/2013 | Baltes | F16F 9/3485 188/282.6 |
| 2013/0180813 A1 * | 7/2013 | Moore, Jr. | B60G 13/06 188/282.6 |
| 2013/0234378 A1 | 9/2013 | Ericksen et al. | |

\* cited by examiner

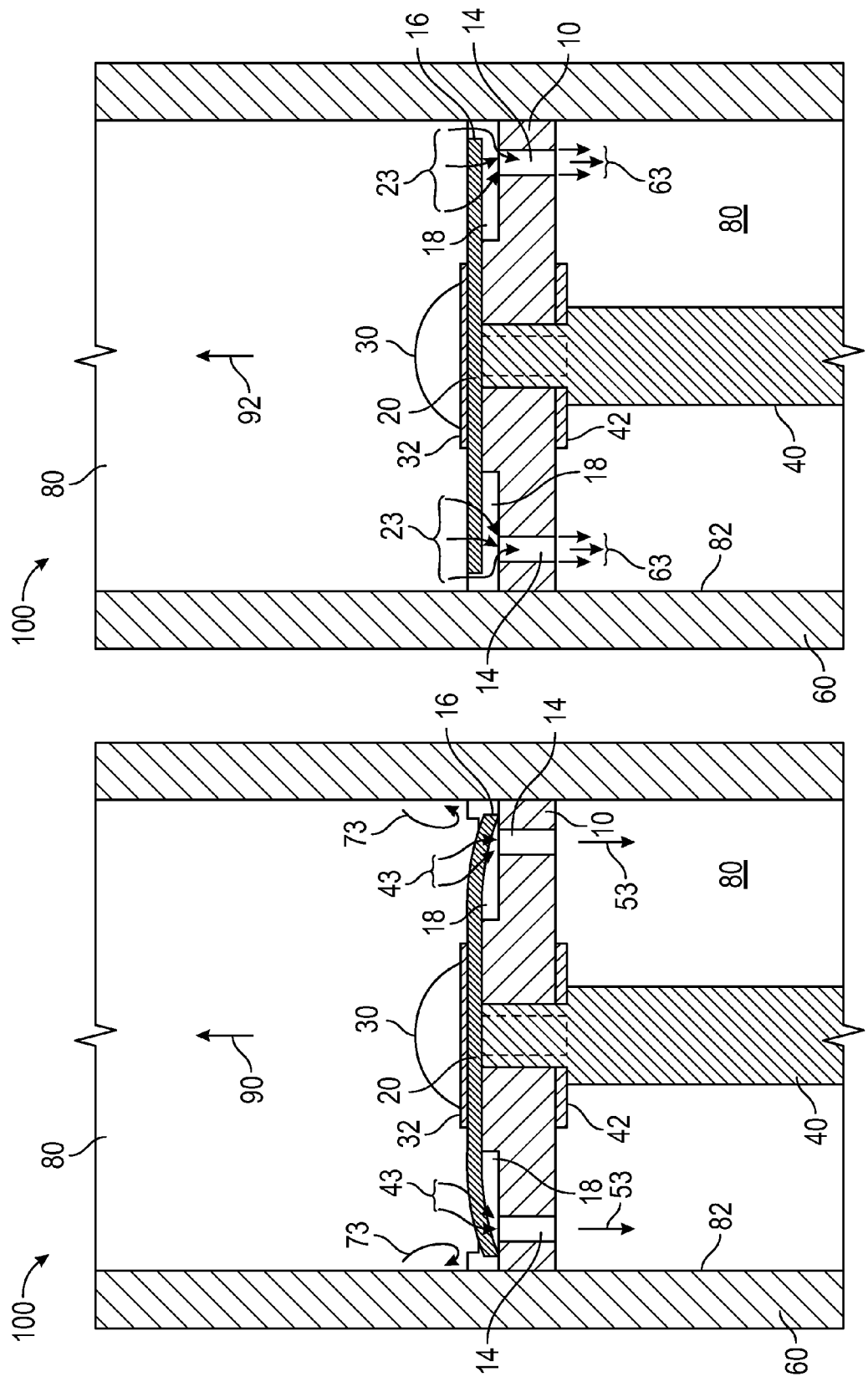

VARIABLE DAMPENING SPEED PISTON HEAD ASSEMBLY FOR RADIO CONTROLLED CARS SHOCK ABSORBER AND METHOD

BACKGROUND OF THE INVENTION

Field of the Invention

The present invention relates generally to shock absorbers and, more particularly in some non-limiting embodiments, to a variable dampening speed piston head assembly for an R/C (Radio controlled) car shock absorber.

Background

The sport of R/C vehicle racing is highly competitive. Professional drivers of R/C vehicles who race at the upper levels of the sport are well paid by sponsors. Engineers and hobbyists have worked for decades to constantly improve performance of R/C vehicles in every aspect of operation including motors, tires, weight, construction, shock absorbers, and the like. R/C vehicle enthusiasts are constantly searching for improved performance. Even small changes that can improve performance of lap speed by fractions of seconds are highly desirable and sought after. However, given the long term intense competition and efforts for improvements in this field, it is somewhat unusual to find improvements that reliably improve lap speed by one-half second or more. Moreover devices that do provide performance improvements are often complex and inconsistent or prone to being less robust than desirable. Devices that provide improved performance in a manner that is readily repeatable and reliable are highly sought after.

Shock absorbers are commonly used in R/C vehicles and are commonly used in conjunction with springs in a variety of applications, particularly vehicles, bicycles, and the like, to control suspension movement by absorbing and dissipating energy during travel. Fluid-filled shock absorbers are one common type of shock absorber wherein a piston fastened to a piston rod travels through fluid in the bore of the piston cylinder. Another common type is similarly constructed, but with a gas instead of a fluid housed within the piston cylinder.

When a vehicle encounters a bump or uneven terrain, the suspension compresses during the compression stroke. After completing the compression stroke, the suspension responds by returning to its original position during the rebound stroke. Valves on the piston head restrict the flow of oil through the piston, causing more pressure to be created in front of the piston then behind it. The pressure differential creates the damping force needed to resist the uncontrolled movement of the piston and associated spring. The desired number of valves for the piston head changes depending on the terrain in which the vehicle will travel, the desired responsiveness of the vehicle, and the like. It would be desirable to have a piston assembly that would be adaptable to respond effectively to a variety of environments.

In the R/C car setting, shock absorbers provide a similar function but on a much smaller scale, which leads to unique problems specific to the R/C car application, including product materials, size difficulties, and the like. Tapered pistons and wafer pistons are just two of many alternatives that have been advanced to combat the problems outlined above. Examples of background patents and publications in the general area of shock absorbers include:

U.S. Pat. No. 4,620,619, issued Nov. 4, 1986, to Emura et al., discloses a variable-damping-force shock absorber such that the damping force determined through an orifice selected by an orifice adjuster according to the driver's preference can further automatically be increased during extension for improvement in road-holding ability and decreased during compression for improvement in riding comfort. The shock absorber according to the present invention comprises an annular member formed with an orifice and a disk valve disposed on top of the annular member. During extension, the disk valve is closed for allowing fluid to by-pass through an orifice of the annular member; during compression, the disk valve is opened for additionally allowing fluid to by-pass through the annular member. Further, since the various elements for adjusting the damping force are completely housed within the piston rod, it is possible to increase the stroke of the piston rod.

U.S. Pat. No. 4,775,038, issued Oct. 4, 1988 to Unnikrishnan et al., discloses a piston valving and seal mechanism for a fluid shock absorbing device. A piston is mountable on a piston rod of the device. The piston has an outer periphery, rebound chamber face and compression chamber face. A piston seal is movably mounted in a groove where the piston rebound chamber face and outer periphery meet. The seal is adjacent compression passages in the outer periphery. A seal retainer plate along the piston rebound chamber face with a backing spring bias the seal. The plate is raised from the rebound chamber face and includes passages through the plate for fluid flow through the plate and into underlying recoil passages in the piston. The seal acts as a check valve for the compression passages. A separate recoil passage valve plate on the compression chamber face, with a backing spring, acts as a valve for the recoil passages.

U.S. Pat. No. 4,809,828, issued Mar. 7, 1989 to Nakazato, discloses a one-way damping valve mechanism in a hydraulic damper having a first hydraulic chamber defined in a cylinder, and a piston rod having an inner end on which there is mounted a piston slidably fitted in the cylinder, divides the first hydraulic chamber into a second hydraulic chamber and a third hydraulic chamber. The valve mechanism produces a damping force when the piston is moved in a prescribed direction to move working oil from the second hydraulic chamber into the third hydraulic chamber. The valve mechanism comprises a subvalve for defining a first hydraulic passage to generate a damping force when the piston moves at an extremely low speed in the prescribed direction, and a main valve for defining a second hydraulic passage to generate a damping force when the piston moves in a medium/high speed range in the prescribed direction.

U.S. Pat. No. 6,540,052, issued Apr. 1, 2003 to Fenn et al., discloses a Damping-valve body, in particular for a piston-cylinder unit filled with damping fluid, having separate passages for two directions of flow, at least some of the passages having an outlet opening that is at least partially covered by at least one valve disk. Each passage has a rib that extends radially, relative to a first direction of flow of the damping fluid, from a boundary wall of the passage and bears a valve support surface for the at least one valve disk.

U.S. Pat. No. 7,040,468, issued May. 9, 2006 to Shinata, discloses a hydraulic shock absorber includes a cylindrical housing within which a piston assembly is slidably received. The piston assembly includes a piston element connected to a piston rod and adapted to divide an interior of the housing into compression and rebound chambers. The piston element has compression and rebound passages to provide fluid communication between the compression and rebound chambers. A valve assembly includes a first valve disc positioned on a lower side of the piston element, and a second valve disc retained on the first valve disc. The second valve disc includes apertures arranged in a circumferentially spaced relationship and are selectively openable and closeable by the first valve disc. A third valve disc is retained on the second valve disc and has notches arranged in a circumferentially spaced relationship. The notches cooperate with the apertures to collectively form ports. The ports are communicated with the compression chamber. A fourth valve disc cooperates with the second valve disc to sandwich the third valve disc so that restrictive orifices are defined in an outer end of the notches. Each of the ports has a cross sectional area greater than that of the restrictive orifices regardless of a relative angular position between the second and third valve discs.

U.S. Pat. No. 7,213,689, issued May 8, 2007 to Chang, discloses a shock absorber for a remote-controlled model car includes a sealing member fixed on the topside of a piston. The sealing member has two opposite flexible portions respectively matching with the flow-guiding holes of the piston, with flow gaps formed between the flexible portions and the upper outer sides of the piston. The flow gap, matching with the extent of an external force imposed upon the shock absorber, can be properly diminished or closed up. Each flexible portion is bored with a flow-adjusting hole smaller than and aligned to the flow-guiding hole of the piston for reducing the flow amount of liquid oil flowing through the flow-guiding hole. When pressed by different-extent external forces, the shock absorber can automatically adjust its buffering force to an excellent condition by adjustment of the flow-adjusting holes and the flow gaps.

U.S. Pat. No. 7,310,876, issued Dec. 25, 2007 to May et al., discloses a method for producing a one-part piston body for a piston-cylinder arrangement, in particular a shock absorber piston, is disclosed. The method may include in a first step, pressing a green compact comprising a revolving web and longitudinal support webs from a sinterable metallurgical powder. In a second step, the green compact may be sintered to form a blank. In a third step, radially disposed stamping tools may be used to form, under material displacement, transverse grooves into at least a part of the support webs through cold deformation. In a fourth step, the blank provided with transverse grooves may be calibrated to its final form through pressing with calibrating tools.

U.S. Pat. No. 8,083,039, issued Dec. 27, 2011 to Vanbrabant, discloses a disc valve assembly for a shock absorber opens due to axial movement of a valve disc. The valve disc is biased against a valve body by a valve spring. The valve spring is designed to provide a circumferentially asymmetrical load biasing the valve disc against the valve body. The disc valve assembly can be used as a piston rebound valve assembly, a piston compression valve assembly, a base valve compression valve assembly or a base valve rebound valve assembly.

U.S. Pat. No. 8,235,188, issued Aug. 7, 2012 to Kais, discloses a damping element for a vibration damper that works with hydraulic fluid. The fundamental structure of the damping element includes a one-piece base body configured as a circular disk, which has a plurality of first flow-through openings, each having an entry cross-section in a first face side of the base body, as well as a plurality of second flow-through openings, each having an entry cross-section in an opposite, second face side of the base body, as well as circular valve disks on both face sides of the base body, which rest against a support surface of the base body, disposed in the center, and at least partially close off exit cross-sections of the flow-through openings. The exit cross-sections are surrounded by control edges, which form contact surfaces for the valve disks and project beyond the support surface as well as the entry cross-sections. The height of the control edges increases with an increasing radial distance from the center point of the base body in the form of a circular disk. According to the invention, the flow-through openings have a flow channel section that is preferably cylindrical and opens into a larger exit cross-section bordered by the control edges.

United States Patent Application No. 2013/0180813, published Jul. 18, 2013 to Moore, Jr., discloses a shock absorber configured to mount within a remote control vehicle. The shock absorber includes a cylindrical housing, a piston rod, and an acircular piston head. The piston head includes a plurality of substantially flat surfaces disposed on sides of the piston head that form bypass gaps between the piston head and the cylindrical housing. The acircular piston head includes a plurality of bypass apertures disposed through the piston head in an angularly asymmetrical configuration. The acircular piston head is generally octagon shaped. The acircular piston head includes a plurality of spaced arcuate edges sized to come in contact with an interior surface of the cylindrical housing. The shock absorber includes a plurality of bypass valves formed by cooperative operation of a shim coupled against the bypass apertures, such that fluid is permitted to flow through the bypass valves in a first direction and is restricted in a second direction.

United States Patent Application No. 2013/0180813, published Sep. 12, 2013 to Ericksen et al., discloses a vehicle damper comprising a fluid filled cylinder, a piston for movement within the cylinder, at least two fluid ports formed in the piston and at least one shim at least partially blocking the ports. In one embodiment, a fluid collection area is formed between the ports and the shim, the collection area permitting communication between fluid in the ports. In another embodiment, the piston includes at least one aperture constructed and arranged to receive a threaded bleed valve.

Many efforts have been made to improve the operation of all components of R/C vehicles including the relatively small size shock absorbers of R/C vehicles. Consequently, those skilled in the art will appreciate the present invention that addresses the above and other problems.

SUMMARY OF THE INVENTION

An object of the present invention is to provide an improved R/C shock absorber that improves racing lap times.

Another possible object of the present invention is to provide an improved piston head assembly for R/C shock absorbers that improves racing performance.

Another possible object is to provide an improved piston head assembly for R/C shock absorbers with variable damping force.

Yet another possible object of the present invention is to provide a reliable and simplified piston for R/C shock absorbers which provides for a variable compression damping force to reliably improve lap times.

Yet another possible object of the present invention is to provide valve members that can be utilized in conjunction with the valve members shown in my previous application Ser. No. 14/631,190, filed Feb. 25, 2015. For simplicity the valve members of my previous application are not shown but are simply mounted in conjunction.

In accordance with the disclosure, one embodiment of the present invention may include, but is not limited to, a variable dampening speed piston head assembly for an R/C shock absorber, the R/C shock absorber comprising a piston rod, a piston cylinder, and fluid within the piston cylinder, the variable dampening speed piston head assembly comprising: a piston head with a round periphery and defining a plurality of variable valve holes to permit two-way fluid flow through the piston head when the piston head reciprocates in the piston cylinder; a dampening member comprising a central portion with a hole therethrough and a plurality of valve members extending radially outwardly from the central portion; a fastener to secure the dampening member and the piston head to the piston rod whereby the plurality of valve members are oriented to engage each of the plurality of variable valve holes to thereby form a plurality of variable valves in the piston head; and the plurality of valve members being mounted to be moveable between a first position relative to the valve holes and a second position relative to the valve holes, in the first position the plurality of valve members being positioned further from the valve holes to allow greater fluid flow through the valve holes than in the second position where the valve members permit a lesser fluid flow through the valve holes.

The plurality of valve members are moveable between the first position and the second position only during a compression stroke.

The plurality of valve members are bendable to move between the first position and the second position.

The plurality of valve members are bendable in response to speed of movement of the piston head in a direction of a compression stroke, the plurality of valve members being responsive to bend to a greater degree in response to a greater speed of the compression stroke than a lesser speed of the compression stroke.

The plurality of valve members may be bendable from the first position to the second position in response to a fall of the R/C vehicle from no more than six inches, no more than eight inches, no more than ten inches, or no more than eleven inches.

The plurality of valve members may be substantially flat from a side view in the first position.

The plurality of valve members are bent so that an end of the plurality of valve members engages the piston head in the second position. In another embodiment, the plurality of valve members are bent so that an only an outermost end of the plurality of valve members engages the piston head in the second position.

The dampening member further comprises a Delrin®, or non-oriented or spun carbon fiber.

The apparatus may further include a recess in the piston head with the dampening member at least partially engaged within the recess.

The recess may include a plurality of scalloped portions corresponding with each of the plurality of valve holes, the plurality of scalloped portions having a thickness less than that of the piston head.

The apparatus may further include at least one self-centering ridge on the piston head.

In accordance with the disclosure, another embodiment may include, but is not limited to, a method for manufacturing a variable dampening speed piston head assembly for an R/C shock absorber, the R/C shock absorber comprising a piston rod, a piston cylinder, and fluid within the piston cylinder, the variable dampening speed piston head assembly.

The steps include providing a piston head with a round periphery and defining a plurality of variable valve holes to permit two-way fluid flow through the piston head when the piston head reciprocates in the piston cylinder, providing a dampening member comprising a central portion with a hole therethrough and a plurality of valve members extending radially outwardly from the central portion, and securing a fastener to the dampening member and the piston head to the piston rod whereby the plurality of valve members are oriented to engage each of the plurality of variable valve holes to thereby form a plurality of variable valves in the piston head.

A final step is mounting the plurality of valve members to be moveable between a first position relative to the valve holes and a second position relative to the valve holes, in the first position the plurality of valve members being positioned further from the valve holes to allow greater fluid flow through the valve holes than in the second position where the valve members permit a lesser fluid flow through the valve holes.

BRIEF DESCRIPTION OF THE DRAWINGS

FIG. 1 is an elevational view, partially in section, of a piston head assembly in an R/C shock absorber during a first compression stroke in accord with one possible non-limiting embodiment of the present invention.

FIG. 2 is an elevational view, partially in section, of a piston head assembly in an R/C shock absorber during a second compression stroke in accord with one possible non-limiting embodiment of the present invention.

Figure 3:
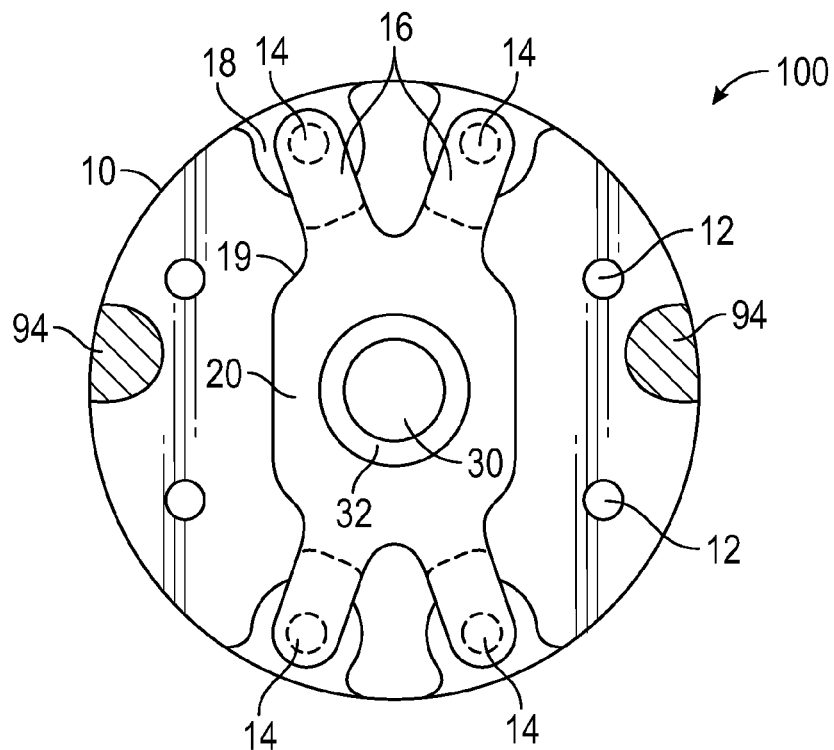
FIG. 3 a top view of a piston head assembly for an R/C shock absorber in accord with one possible non-limiting embodiment of the present invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENT

As shown in FIG. 1 and FIG. 2, piston head assembly 100 is disposed within piston cylinder 60 with the piston cylinder operably attached to a spring (not shown) for the suspension system. This type of spring and piston cylinder suspension system is well known in the art. The movement of the shock absorber and spring is dependent on the force encountered by the suspension, and the damping force is selected to best keep the R/C car wheels supported completely on the ground during the suspension travel. The improvements to the piston head of the present invention as described herein act to greatly enhance operation of the suspension system especially when compression occurs within the piston such as when the R/C vehicle lands from heights. The piston head 10 moves within fluid 80 that is in the cylinder as is known in the prior art.

FIG. 1 is a partial sectional elevational view of piston head assembly 100 in an R/C shock absorber during a first compression stroke in accord with the present invention. When an R/C car or vehicle lands from a jump that moves the piston very fast so that the chassis would hit the ground, for instance, the suspension reacts as depicted in FIG. 1 to slow movement of the piston. This is important to prevent the vehicle chassis from contacting the ground, thereby interrupting the intended and desired travel of the vehicle. Piston rod 40 and piston head 10 travel within piston cylinder 60 as indicated by arrow 90 when the car lands from the jump. Piston head 10 has a round shape which engages cylinder wall 82, preventing fluid flow along the periphery of piston head 10.

In this embodiment, dampening member 20 lies on top of piston 10 and is secured with fastener 30, washer 32, and washer 42. In another embodiment, dampening member 20 may fit within a recess of piston head 10 so as to be flush with the surface of piston head 10. Washer 32 is sized to cover dampening member 20 while allowing valve members 16 which extend radially outwardly (see also FIG. 2) the flexibility to bend as piston assembly 100 moves. Fastener 30 may comprise various fasteners suitable for connecting with rod 40, including, but not limited to screws, nuts, and the like. In other embodiments, various alternative fastening arrangements may be utilized to secure piston head 10 to piston rod 40 consistent with the teachings of the present invention.

Accordingly, dampening member 20 comprises valve members 16 which extend radially outwards from dampening member body 20 corresponding with variable flow valve holes 14. In this embodiment, variable flow valve holes 14 are formed within scalloped portions 18 which have a thickness less than the rest of piston or piston head 10. When piston assembly 100 is moving fast as indicated at arrow 90, valve members 16 flex as indicated in FIG. 1 to at least substantially restrict flow through variable valve holes 14. Valve members 16 are bendable as depicted in FIG. 1 in response to a fall of an R/C vehicle from no less than six inches. In other embodiments, valve members 16 are responsive to falls from no less than eight inches, ten inches, or eleven inches.

In another embodiment, piston 10 may further comprise a plurality of one way holes that only allow fluid travel in one direction (Not shown—see my previous U.S. application Ser. No. 14/631,190, which is incorporated in its entirety herein). In that embodiment, which is readily utilized in conjunction the with present invention, reduced flow always occurs during compression of the piston as compared with greater flow during movement of the opposite way allowing quicker rebound. Dampening member 20 is simply mounted in conjunction with the member of my previous invention.

In some embodiments, valve members 16 may flex sufficiently to contact scalloped portions 18 and variable valve holes 14 to restrict more flow, while in other embodiments valve members 16 may bend less but still inhibit flow through valve holes 14 as shown at arrows 73. Regardless, fluid is still able to flow through variable valve holes 14 during compression because of the decreased thickness of scalloped portions 18 as compared to piston head 10 allowing fluid to surround valve members 16 and pass through valve holes 14 as indicated at arrows 53, 43. In other words, flow through variable flow valve holes 14 is not completely blocked during compression. This is different from my previous invention, which completely blocks compression through some openings in the valve during and allows greater flow during the rebound. Preferably, valve members 16 extend in a symmetrical way from dampening member body 20 so that the forces produced by operation of the one-way valves do not cause tilting of piston head 10 during operation.

In a preferred embodiment, dampening member 20 is made of a material that is both sufficiently rigid and resilient to be suitable to be able to withstand the shock and wear of normal operation to prevent disintegration inside piston cylinder 60. In one possible preferred embodiment, dampening member 20 could be constructed of Delrine®, or non-oriented or spun carbon fiber. However, other resilient, rigid materials could be used consistent with the teachings herein. In a preferred embodiment, the material is selected to allow a range of operation between at least anticipated ambient temperatures.

FIG. 2 is another partial sectional elevational view of piston head assembly in a piston assembly 100 during a second compression stroke as indicated at 92 in accord with one embodiment of the present invention. However, in this figure, the piston is moving at a slower rate than in FIG. 1. For instance, the R/C car may encounter a bump in the road, wherein the high fluid flow allows the wheels to follow the bump and maintain contact with the road, rather than bounce when encountering the bump. Thus, a variable flow valve is provided that varies the flow through the piston depending on the speed of movement acting on piston 10. In the slower moving possibility of FIG. 2, when piston 10 and piston rod 40 are moving within piston cylinder 60 as indicated by arrow 92, the valve members 16 do not flex. Fluid flows through variable valve holes 14 just as described herein with regards to FIG. 1. Accordingly, in this embodiment dampening member 20 and valve members 16 do not flex to substantially block variable valve holes 14 because piston assembly 100 is not traveling as quickly as in FIG. 1. Valve members 16 are configured to bend to a greater degree in response to a greater speed of the compression stroke than a lesser speed of the compression stroke, so that valve members 16 do not flex at all on a relatively flat surface or with smaller bumps while also being responsive to differing racing conditions such as drops from heights when desired. During drops from heights the fluid flow is slowed so that the piston slows but does not bottom out.

Because valve members do not bend for relatively small movements, the relative increase in space in a comparison between FIG. 2 and FIG. 1 between valve members 16 and scalloped portions 18 increases the fluid flow through variable valve holes 14 as indicated by arrows 23 and 63. The increased flow of fluid 80 through piston 10 provides for a normal operation for piston head assembly 100 with relatively smaller changes in the track. By providing different responses based on the speed of the compression stroke, piston head assembly 100 better maintains wheel contact with the road or track on the rebound stroke of the shock absorber.

FIG. 3 is a top view of piston head assembly 100 for an R/C shock absorber in accord with one possible embodiment of the present invention. The thickness of piston head 10 may typically be equal to or less than the thickness of the stock piston head assemblies provided with the R/C vehicles. Dampening member 20 defines central aperture through which fastener 30 extends for connecting piston head 10 and dampening member 20 to piston rod 40 utilizing washer 32. Piston head 10 further comprises a plurality of two-way valve holes 12 surrounding the periphery to allow fluid flow in both directions in response to reciprocating movement of piston head 10 within piston cylinder 60.

The number of two-way valve holes 12 depends on the R/C application for which piston head 10 is sought, as different shock absorbers have varying number of valves on the piston head as is known to those of skill in the art. Different users may prefer the use of different numbers of two-way valve holes 12. In this embodiment, dampening member 20 fits within recess 19 with valve members 16 protruding into scalloped portions 18 partially restricting variable valve holes 14. In another embodiment, dampening member body 20 may rest on the face of piston head 10 secured by fastener 30. Scalloped portions 18 form a part of recess 19 and extend to the periphery of piston head 10. In this embodiment, self-centering ridges 94 are formed on piston head 10 to divert the fluid encountered during suspension travel in a uniform fashion and prevent axial movement of piston head 10 during operation.

Figure 4:
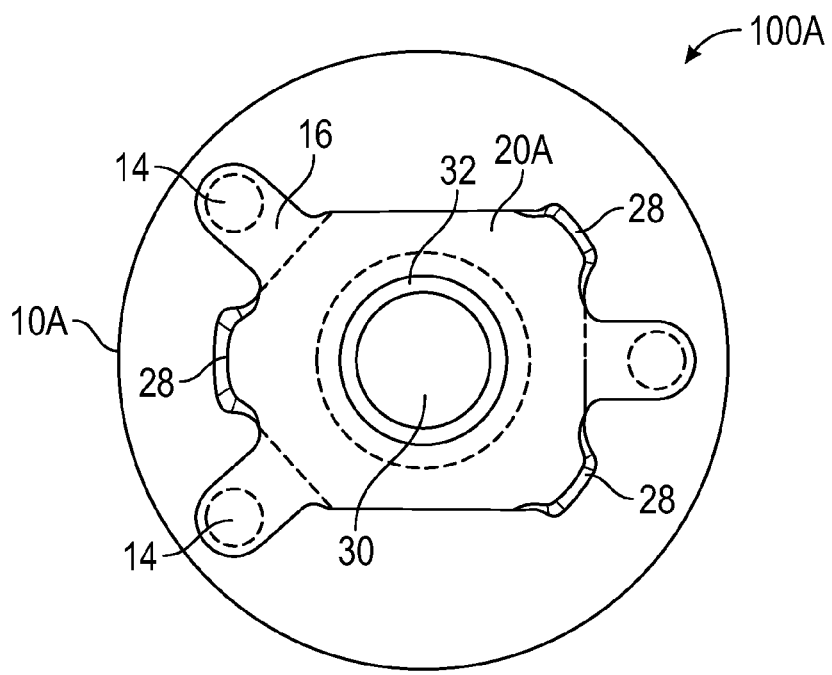
FIG. 4 is a top view of another piston head assembly for an R/C shock absorber in accord with one possible non-limiting embodiment of the present invention.

FIG. 4 is a top view of piston head assembly 100A for an R/C shock absorber in accord with another possible embodiment of the present invention. In this embodiment, there are only three valve members 16 for dampening member 20A. In this embodiment, dampening member body 20A is secured to piston 10 by tabs 28 which may extend from piston 10 to hold dampening member 20A in place, effectively forming a recess in which the dampening body resides. Furthermore, scalloped portions 18 may not be utilized so that the tabs hold dampening member 20A and allow dampening member 20A to be spaced from piston 10. The operation is the same with the fluid flow through variable flow valve holes 14 to vary depending on the speed or acceleration or force acting on piston 10 during compression.

In a preferred embodiment, piston 10 is comprised of a plastic or hard composite material. In one embodiment, piston 10 has a diameter of less than three eighths inch. In another embodiment, piston 10 may have a diameter greater than one sixteenth inch, but less than one quarter inch. In one embodiment, the thickness of piston 10 is less than one-eighth of an inch.

The number of valve members 16 and variable flow valve holes 14 may range from one as to many as desired. Other arrangements for at least one valve member 16 and at least one variable valve holes 14 may be provided. While in this embodiment, a center portion of dampening member 20 is provided with a hole in the center, in another embodiment at least one valve member 16 may be offset from the center of the R/C piston and a center portion of the flexible member does not necessarily have a hole therethrough for connection with fastener 30. Dampening member 20 or 20A is preferably mounted on the top as shown (on an opposite side from the piston rod) and preferably is a single flexible member mounted on top of the piston as shown.

My previous application Ser. No. 14/631,190, filed Feb. 25, 2015, for piston head assembly for radio controlled shock absorber and method shows one-way valves in the piston head that may be utilized in conjunction with the present invention and is incorporated herein in its entirety. The valve members from my previous invention are not shown in the drawings herein for simplicity. However, the dampening member 20 of the present invention and those of my previous invention are both readily included in the same piston head and in a preferred embodiment both types of valves are utilized for improved operation.

As discussed in detail in my previous application, the valves in my previous application prevent flow through some openings in the valve head during compression and allow flow when the piston moves in the opposite way. Accordingly, in my previous application, a valve could effectively have four holes during compression and then eight holes during rebound and may be described in this way as four/ eight hole operation since users understand a piston with either four or eight hole valve openings of a selected size as used in the prior art making operation readily understood. Whereas, in the present invention, the valves act to reduce flow during fast compression but otherwise allow normal operation of the piston. Thus, the valves in my previous application are always operational whereas the valves in my present invention act as described herein to reduce flow during hard compression. The valve elements of the present invention may be mounted with and may be above the valves of my present invention and mounted and secured with fastener 30 and washer 32. Recesses in the valve head provided by grooves, tabs, or the like, may or may not be utilized to assist in keeping the valve members such as valve member 16 of the present invention and valve members of the previous invention from rotating so as to maintain registration with valve openings. The valve members 16 and valve members of my previous members are spaced apart from each other on the piston.

In general overview of the drawings, it will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include highly simplified conceptual views and exaggerated angles, sizes, and the like, as desired for easier and quicker understanding or explanation of the invention.

One of skill in the art upon reviewing this specification will understand that the relative size, orientation, angular connection, and shape of the components may be greatly different from that shown to provide illuminating instruction in accord with the novel principals taught herein. As well, connectors, component shapes, and the like, between various housings and the like may be oriented or shaped differently or be of different types as desired. Many additional changes in the details, components, steps, and organization of the system and method, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A variable dampening speed R/C piston head assembly for an R/C shock absorber on an R/C vehicle, said R/C shock absorber comprising a piston rod, a piston cylinder, and fluid within said piston cylinder, said variable dampening speed R/C piston head assembly comprising:

an R/C piston head with a round periphery and defining a plurality of valve holes to permit two-way fluid flow through said R/C piston head when said R/C piston head reciprocates in said piston cylinder;

a dampening member comprising a central portion with a hole therethrough and a plurality of valve members extending radially outwardly from said central portion;

said plurality of valve members are oriented to engage each of said plurality of valve holes to thereby form a plurality of variable valves in said R/C piston head;

said plurality of valve members being mounted to be moveable between a first position relative to said valve holes and a second position relative to said valve holes, in said first position said plurality of valve members being positioned further from said valve holes to allow greater fluid flow through said valve holes than in said second position wherein said valve members permit a lesser fluid flow through said valve holes, each respective one of said plurality of valve members being constructed in a region of said plurality of valve holes to provide uniform flow through each of said plurality of valve holes;

said plurality of valve members are moveable toward said second position only during a compression stroke, each respective one of said plurality of valve members being utilized with only one of said plurality of valve holes;

said plurality of valve members are bendable to move between said first position and said second position, and providing that each respective one of said plurality of valve members being formed without openings in a region of said plurality of valve holes;

said plurality of valve members are bendable in response to speed of movement of said R/C piston head in a direction of a compression stroke, said plurality of valve members being responsive to bend to a greater degree in response to a greater speed of said compression stroke than a lesser speed of said compression stroke; and said plurality of valve members are substantially flat from a side view in said first position.

2. The variable dampening speed R/C piston head assembly of claim 1, wherein said plurality of valve members are bendable from said first position to said second position in response to a fall of said R/C vehicle from no more than six inches.

3. The variable dampening speed R/C piston head assembly of claim 1, wherein said plurality of valve members are bendable from said first position to said second position in response to a fall of said R/C vehicle from no more than eight inches.

4. The variable dampening speed R/C piston head assembly of claim 1, wherein said plurality of valve members are bendable from said first position to said second position in response to a fall of said R/C vehicle from no more than ten inches.

5. The variable dampening speed R/C piston head assembly of claim 1, wherein said plurality of valve members are bendable from said first position to said second position in response to a fall of said R/C vehicle from no more than eleven inches.

6. A variable dampening speed R/C piston head assembly for an R/C shock absorber on an R/C vehicle, said R/C shock absorber comprising a piston rod, a piston cylinder, and fluid within said piston cylinder, said variable dampening speed R/C piston head assembly comprising:

an R/C piston head with a round periphery and defining a plurality of valve holes to permit two-way fluid flow through said R/C piston head when said R/C piston head reciprocates in said piston cylinder;

a dampening member comprising a central portion with a hole therethrough and a plurality of valve members extending radially outwardly from said central portion;

said plurality of valve members are oriented to engage each of said plurality of valve holes to thereby form a plurality of variable valves in said R/C piston head;

said plurality of valve members being mounted to be moveable between a first position relative to said valve holes and a second position relative to said valve holes, in said first position said plurality of valve members being positioned further from said valve holes to allow greater fluid flow through said valve holes than in said second position wherein said valve members permit a lesser fluid flow through said valve holes, each respective one of said plurality of valve members being constructed in a region of said plurality of valve holes to provide uniform flow through each of said plurality of valve holes;

said plurality of valve members are moveable toward said second position only during a compression stroke, each respective one of said plurality of valve members being utilized with only one of said plurality of valve holes;

said plurality of valve members are bendable to move between said first position and said second position, and providing that each respective one of said plurality of valve members being formed without openings in a region of said plurality of valve holes;

said plurality of valve members are bendable in response to speed of movement of said R/C piston head in a direction of a compression stroke, said plurality of valve members being responsive to bend to a greater degree in response to a greater speed of said compression stroke than a lesser speed of said compression stroke; and said plurality of valve members are bent so that an end of said plurality of valve members engages said R/C piston head in said second position.

7. The variable dampening speed R/C piston head assembly of claim 6, wherein said plurality of valve members are bent in said second position so that only an outermost end of said plurality of valve members engages said R/C piston head in said second position.

8. The variable dampening speed R/C piston head assembly of claim 6, wherein said dampening member further comprises a plastic, or non-oriented or spun carbon fiber.

9. A variable dampening speed R/C piston head assembly for an R/C shock absorber on an R/C vehicle, said R/C shock absorber comprising a piston rod, a piston cylinder, and fluid within said piston cylinder, said variable dampening speed R/C piston head assembly comprising:

an R/C piston head with a round periphery and defining a plurality of valve holes to permit two-way fluid flow through said R/C piston head when said R/C piston head reciprocates in said piston cylinder;

a dampening member comprising a central portion with a hole therethrough and a plurality of valve members extending radially outwardly from said central portion;

said plurality of valve members are oriented to engage each of said plurality of valve holes to thereby form a plurality of variable valves in said R/C piston head;

said plurality of valve members being mounted to be moveable between a first position relative to said valve holes and a second position relative to said valve holes, in said first position said plurality of valve members being positioned further from said valve holes to allow greater fluid flow through said valve holes than in said second position wherein said valve members permit a lesser fluid flow through said valve holes, each respective one of said plurality of valve members being constructed in a region of said plurality of valve holes to provide uniform flow through each of said plurality of valve holes; and a recess in said R/C piston head, said dampening member being at least partially engaged within said recess.

10. The variable dampening speed R/C piston head assembly of claim 9 wherein said recess further comprises a plurality of scalloped portions corresponding with each of said plurality of valve holes, said plurality of scalloped portions having a thickness less than that of said R/C piston head.

11. The variable dampening speed R/C piston head assembly of claim 9, further comprising at least one self-centering ridge on said R/C piston head.

* * * * *